(12) United States Patent
Lindberg et al.

(10) Patent No.: US 6,457,140 B1
(45) Date of Patent: *Sep. 24, 2002

(54) METHODS AND APPARATUS FOR DYNAMICALLY ISOLATING FAULT CONDITIONS IN A FAULT TOLERANT MULTI-PROCESSING ENVIRONMENT

(75) Inventors: Lars Olof Mikael Lindberg, Täby; Ulf Peter Hansson, Huddinge; Lars Johan Pettersson, Årsta, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/210,028

(22) Filed: Dec. 11, 1998

Related U.S. Application Data

(63) Continuation-in-part of application No. 08/989,001, filed on Dec. 11, 1997, now Pat. No. 6,088,329.

(30) Foreign Application Priority Data

Jun. 10, 1998 (SE) .............................. 9802058

(51) Int. Cl.$^7$ ................................ H02H 3/05
(52) U.S. Cl. ................ 714/6; 714/8; 714/25; 370/220; 370/387; 709/239
(58) Field of Search ............... 714/25, 48, 763, 714/764, 820, 821, 217, 1–12; 370/244, 217, 220, 387, 216, 219, 337; 709/239

(56) References Cited

U.S. PATENT DOCUMENTS

| | | | |
|---|---|---|---|
| 4,486,739 A | 12/1984 | Franaszek et al. | |
| 5,021,947 A | * 6/1991 | Campbell et al. | ............ 364/200 |
| 5,268,909 A | 12/1993 | Loebig | |
| 5,485,453 A | 1/1996 | Wahlman et al. | |
| 5,493,566 A | 2/1996 | Ljungberg et al. | |
| 5,502,728 A | * 3/1996 | Smith, III | ...................... 714/5 |
| 5,537,583 A | * 7/1996 | Truong | ........................ 395/550 |
| 5,577,196 A | * 11/1996 | Peer | ............................ 707/521 |
| 5,619,510 A | * 4/1997 | Kurano | ...................... 371/20.1 |
| 5,745,502 A | * 4/1998 | Khayrallah et al. | ........... 371/35 |
| 5,812,556 A | * 9/1998 | Schmidt | ........................ 371/3 |
| 6,088,329 A | * 7/2000 | Lindberg et al. | ............ 370/217 |
| 6,115,302 A | * 9/2000 | Proebsting | .................. 365/200 |

FOREIGN PATENT DOCUMENTS

| | | |
|---|---|---|
| WO | 93/15579 | 8/1993 |
| WO | 97/13390 | 4/1997 |

* cited by examiner

*Primary Examiner*—Jeffrey Gaffin
*Assistant Examiner*—RiJue Mai
(74) *Attorney, Agent, or Firm*—Burns, Doane, Swecker & Mathis, L.L.P.

(57) ABSTRACT

A fault tolerant processing system includes at least two processing planes. Each processing plane processes an input signal and generates an output signal. The system further includes plane termination logic for receiving the output signals of the processing planes to generate a non-redundant output signal. Each processing plane is provided with devices for detecting a fault in the plane, and devices for substituting, in response to detection of a fault in the plane, a signal component, referred to as control component, representing a predetermined logical state for each one of those components of the processed input signal that are affected by the detected fault. Furthermore, the plane termination logic includes devices for performing logical operations on the output signals of the planes such that, in the generation of the non-redundant output signal, unaffected signal components of a received signal override corresponding control components of another received signal.

35 Claims, 10 Drawing Sheets

METHODS AND APPARATUS FOR DYNAMICALLY ISOLATING FAULT CONDITIONS IN A FAULT TOLERANT MULTI-PROCESSING ENVIRONMENT

This application is a Continuation-in-Part of U.S. patent application Ser. No. 08/989,001, filed Dec. 11, 1997, now U.S. Pat. No. 6,088,329. This application claims priority under 35 U.S.C. §§119 and/or 365 to 9802058-9 filed in Sweden on Jun. 10, 1998; the entire content of which is hereby incorporated by reference.

BACKGROUND

The present invention generally relates to a fault tolerant processing system and to a method of operating a fault tolerant processing system as well as a method for terminating a number of processed signals into a non-redundant signal.

In many processing systems, a redundant system architecture is utilized to meet the requirements on safety and reliability and to increase the mean time between system failure (MTBSF). Redundancy in a processing system is ensured by using multiple processing units that operate in parallel. With this arrangement, a faulty processing unit can easily be switched out of operation while the remaining and still-functioning processing units will maintain proper operation of the overall processing system. In the following, the processing units are normally referred to as processing planes.

A redundant system generally has a termination point at which the redundancy is terminated. In the termination point, plane termination logic determines which one of the processing planes that should be used, and the output signal of that plane is utilized as a non-redundant output signal of the processing system.

In the specific field of telecommunications, switches and switching systems are normally made redundant, using multiple switching planes, to maintain a desired quality of service for the users of the switching network. In known switching systems, the redundancy is terminated by using plane selection bits provided in the transmitted time slots.

FIG. 1 schematically illustrates an example of a conventional redundant switching system. The switching system 10 comprises a control system 1, and a switching arrangement 2. The switching arrangement 2 comprises a distribution unit 3, a number of identical and parallel switching planes 4, 5, 6, and plane termination logic 7. In the illustrated example, there are three switching planes. The distribution unit 3 receives an input signal, and is designed to distribute the incoming input signal to each one of the switching planes 4, 5, 6. The output signals of the switching planes 4, 5, 6 are sent to the termination logic 7. In conventional switching systems, each transmitted time slot in each plane is provided with a plane selection bit such that each time slot includes a byte of information and a plane selection bit. The plane selection bits from the switching planes are utilized in a plane selection algorithm 8 incorporated in the termination logic 7 to determine, for each time slot, which one of the switching planes to use. When all switching planes function properly, it does not matter which plane is selected, and the selection algorithm 8 simply selects a predetermined one of the switching planes. However, if two of the planes are determined to be faulty by the overall control system 1, then the control system 1 sets the corresponding plane selection bits to "invalid", and the remaining still-functioning plane is selected by the selection algorithm 7.

In conventional control systems, a software analysis of disturbances or faults in the switching planes is performed in order to determine the status (OK/faulty) of the planes. In a switching network, there are many examples of disturbances, such as parity errors, sporadic bit-errors and line code errors. Some of these disturbances are unavoidable, and there is generally no reason to intervene for a single disturbance. However, it is necessary to monitor the disturbance rate. If the rate of, for example, bit-errors in a switching plane rises to an unacceptable level, then the software has to react and set the plane selection bits of that plane to "invalid", thus isolating the faulty plane.

With this prior art arrangement, the determination by the software that a plane is faulty takes place long after the actual occurrences of the disturbances. Consequently, the disturbances can not be corrected for.

In addition, the disturbances tend to propagate through the switching network and generate additional disturbances such that the control system software is flooded by different types of alarms.

SUMMARY OF THE INVENTION

The present invention overcomes these and other drawbacks of the prior art arrangements.

It is a general object of the present invention to provide a fault tolerant processing system that is improved with respect to isolation of faults occurring in the system.

It is another object of the present invention to provide a processing plane, for use with at least one like processing plane in a fault tolerant system, which in the event of a fault in the plane generates an output signal that facilitates recovery of valid processed data from the other processing planes.

It is yet another object of the invention to provide a method of operating a fault tolerant processing system.

Still another object of the invention is to provide a method for terminating at least two processed signals into a non-redundant signal.

The invention is especially applicable to a fault tolerant system having at least two processing planes, where each plane is operable for processing an input signal to generate an output signal, and plane termination logic for receiving the output signals of the processing planes to generate a non-redundant output signal.

In accordance with a first aspect of the invention, the processing planes operate continuously in parallel with each other, and, in one embodiment, the output signals of the processing planes are OR'ed together in the plane termination logic to generate the non-redundant output signal of the system. According to the same embodiment, each processing plane comprises means for detecting a fault or disturbance in the plane, and means for substituting, in response to detection of a fault in the plane, a signal component representing a logical zero for each one of those components of the processed input signal that are affected by or otherwise associated with the detected fault. Since signal components affected by a fault are "set" to zero, valid bits from the still-functioning plane or planes will be presented as output bits in the non-redundant output signal due to the OR-operation in the plane termination logic.

According to another embodiment, the "resetting" of affected signal components to logical zero and logically OR'ing the output signals of the planes are replaced by "setting" the affected signal components to logical one combined with logically AND'ing the output signals of the planes.

It will be appreciated that in a more general form of the invention, each one of the signal components that are affected by a detected fault is substituted by a signal component, referred to as a control component, of a predetermined logical state. In this context, it should be understood that the logically OR'ing and logically AND'ing are merely examples of the more general function of performing logical operations on the output signals of the planes such that, in the generation of the non-redundant output signal, unaffected signal components in a processed signal will override corresponding control components in another processed signal. Since unaffected signal components override affected signal components, the unaffected and valid signal components will be presented in the non-redundant output signal.

The processing performed by the processing planes is preferably switching, or switching in combination with some other processing, such as multiplexing and demultiplexing, associated with switching.

The invention runs counter to the predominant trend in the prior art in that it does not propose isolation of faulty processing planes, but instead proposes dynamic and local isolation of faults directly in the planes.

In addition, the redundancy termination according to the invention does not use plane selection bits, and hence the bandwidth demand is reduced.

In accordance with a second aspect of the invention, a processing plane for use with at least one like processing plane in a fault tolerant system is provided. The processing plane is operable for processing an input signal, and comprises means for detecting a fault in the plane, and means for substituting a signal component representing a predetermined logical state for each one of those signal components of the processed input signal that are affected by the detected fault.

The invention offers the following advantages:

Fast and dynamic fault isolation (isolation of faults as they occur);

Reduced bandwidth demand;

No propagation of faults;

Other advantages offered by the present invention will be appreciated upon reading of the below description of the embodiments of the invention.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, wherein:

DETAILED DESCRIPTION

The invention will now be described with reference to illustrative examples of a specific processing system, namely a fault tolerant switching system. However, the invention is not limited thereto, and it will be appreciated that the invention may be applied to other types of switching, and other types of processing as well.

Figure 1:
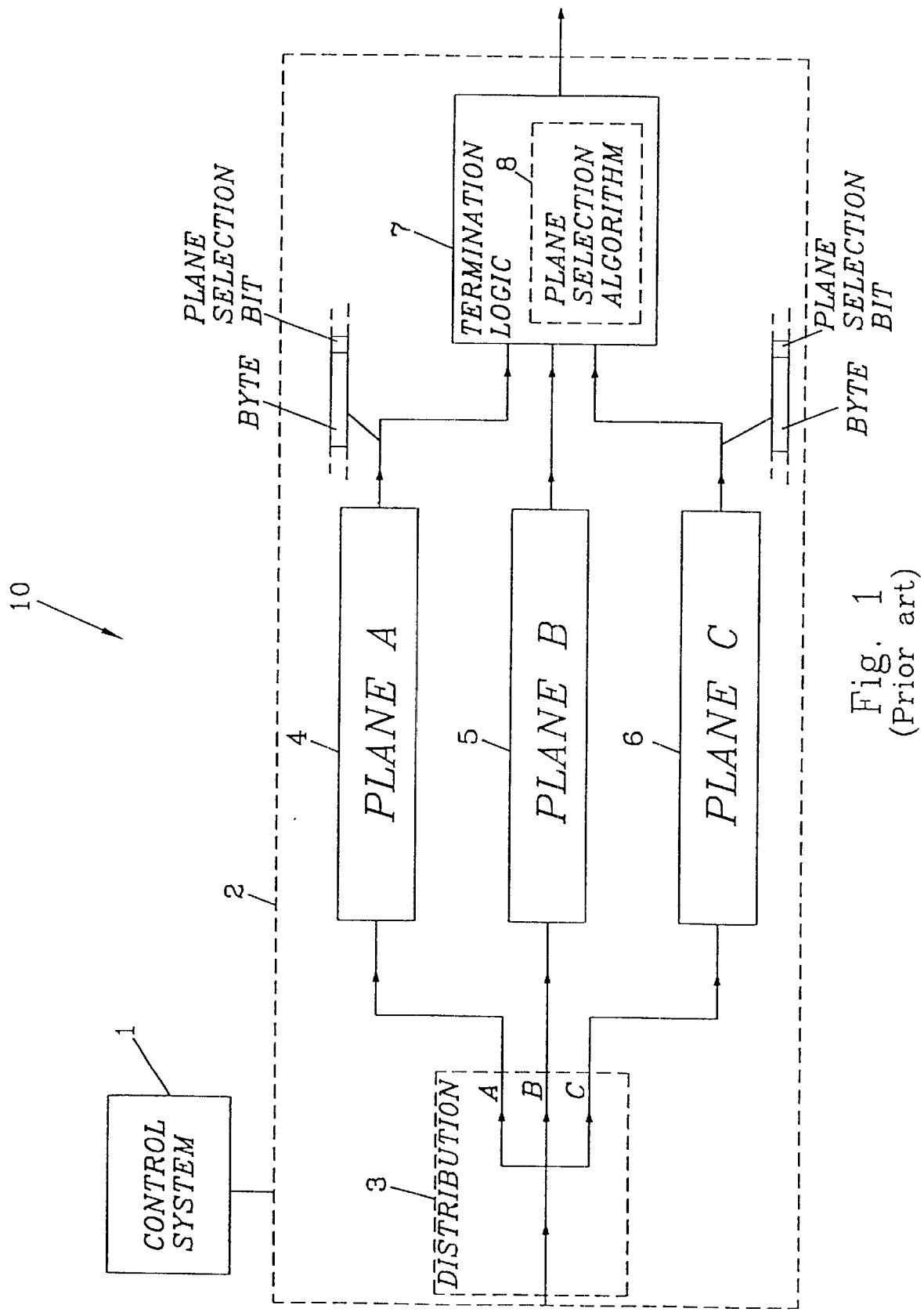
FIG. 1 schematically illustrates an example of a conventional redundant switching system.
Figure 2:
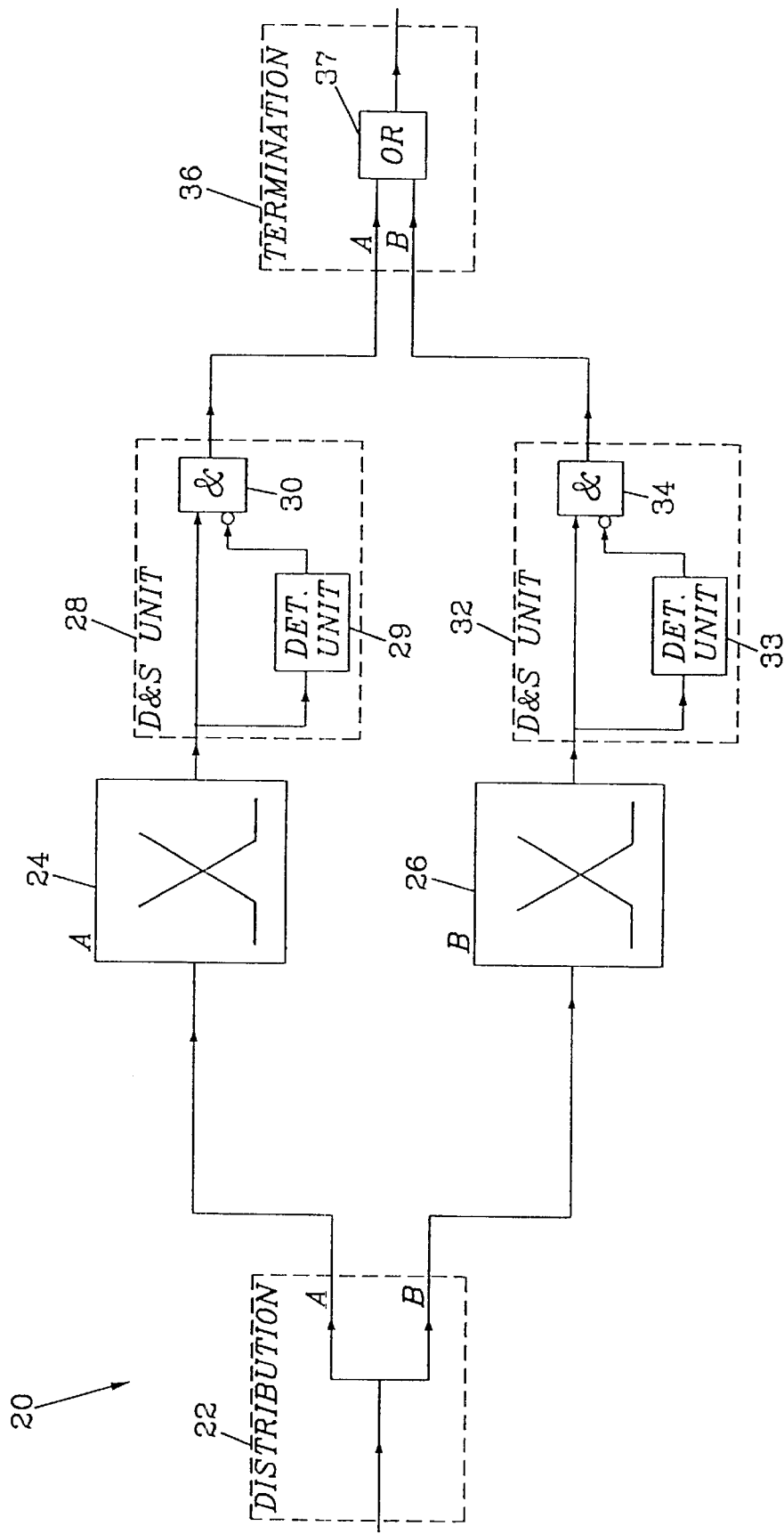
FIG. 2 is a schematic diagram of an illustrative example of a switching system according to a first embodiment of the invention.

FIG. 2 is a schematic diagram of an illustrative example of a switching system according to a first embodiment of the invention. The switching system 20 comprises a distribution unit 22, two parallel switching planes A and B, and a termination unit 36. Each switching plane comprises a switch 24/26 and a detecting and substituting (D&S) unit 28/32. Although only two switching planes are illustrated, it should be understood that more than two switching planes can be used.

The distribution unit 22 receives an incoming input signal and is designed to distribute the incoming input signal to each one of the switches 24, 26 such that the switches receive identical input signals. As an example, the switches 24, 26 are conventional telecommunication switches. Preferably, the user data carried by the input signals are placed in time slots, and the time slots are normally arranged in frames. In the switches 24, 26, user data is moved between different time slots and frames. This is accomplished by delaying the user data in memories. The output signals of the switches 24, 26 are sent to the termination unit 36. The termination unit 36 comprises circuitry 37 for logically OR'ing the received output signals to generate a non-redundant output signal. Preferably, the circuitry 37 for logically OR'ing the received output signals from the switches 24, 26 is in the form of a plurality of OR-gates such that the OR-operation is performed on a bit-by-bit basis.

Furthermore, each plane comprises at least one D&S-unit 28/32. Each D&S-unit is capable of detecting faults in the plane that affect one or more signal components of the processed input signal. In response to detection of a fault, the D&S-unit substitutes a signal component representing a logical zero for each one of those components of the processed signal that are affected by a detected fault. In the illustrated example, the D&S-unit 28 is provided in the line between the switch 24 and the termination unit 36, and the D&S-unit 32 is provided between the switch 26 and the termination unit 36. However, it should be understood that the D&S-units 28, 32 may be incorporated into the system at any suitable place. In this example, the D&S-unit 28 comprises a detecting unit 29 and an AND-circuit 30. The detecting unit 29 receives the output signal of the switch 24 to detect faults associated with one or more signal components of the signal. The detecting unit 29 generates a control signal which is high at detection of a fault and low otherwise. The AND-circuit 30 receives the output signal of the switch 24 and the control signal from the detecting unit 29 in inverted form due to an inverting input terminal.

Preferably, the AND-circuit 30 is in the form of a plurality of AND-gates such that the output signal is logically AND'ed with the inverted control signal on a bit-by-bit basis. The D&S-unit 32 also comprises a detecting unit 33 and an AND-circuit 34 connected in the same way as in the D&S-unit 28.

Preferably, the detecting units detect hardware faults by parity errors, incorrect checksums, lost frame alignment or, if the switching system utilizes line coding, even line code errors. So, the detecting units may include parity checkers, incorrect checksum detectors, line code error detectors and detectors for lost frame alignment.

In the example of FIG. 2, serial interfaces are used throughout the switching system.

If the system utilizes transmission with parity, the system 20 is provided with a parity generator (not shown) which provides each transmitted byte with one or more parity bits, and a parity checker arranged at a receiving side to detect a fault causing a parity error. There are many examples of conventional parity checkers. Advanced conventional parity checkers may even point out which bit in the transmitted byte that is incorrect.

As an example, assume that the detecting unit 33 in the D&S-unit 32 of plane B includes a parity checker which has detected a parity error associated with a byte of information in the output signal from the switch 24. Then the control signal of the detecting unit 33 will be high for the affected byte. The inverting input terminal of the AND-circuitry transforms the high state, "1", of the control signal into a low state, "0". In the AND-circuit 34, each one of the bits in the affected byte will be AND'ed with a "0". Consequently, each one of the affected bits will be substituted by a logical zero, "0".

Of course, if the detecting part in the D&S-unit is configured to detect faults that affect single bits, the D&S-unit may, if appropriate, isolate single bits instead of whole bytes.

Figure 3:
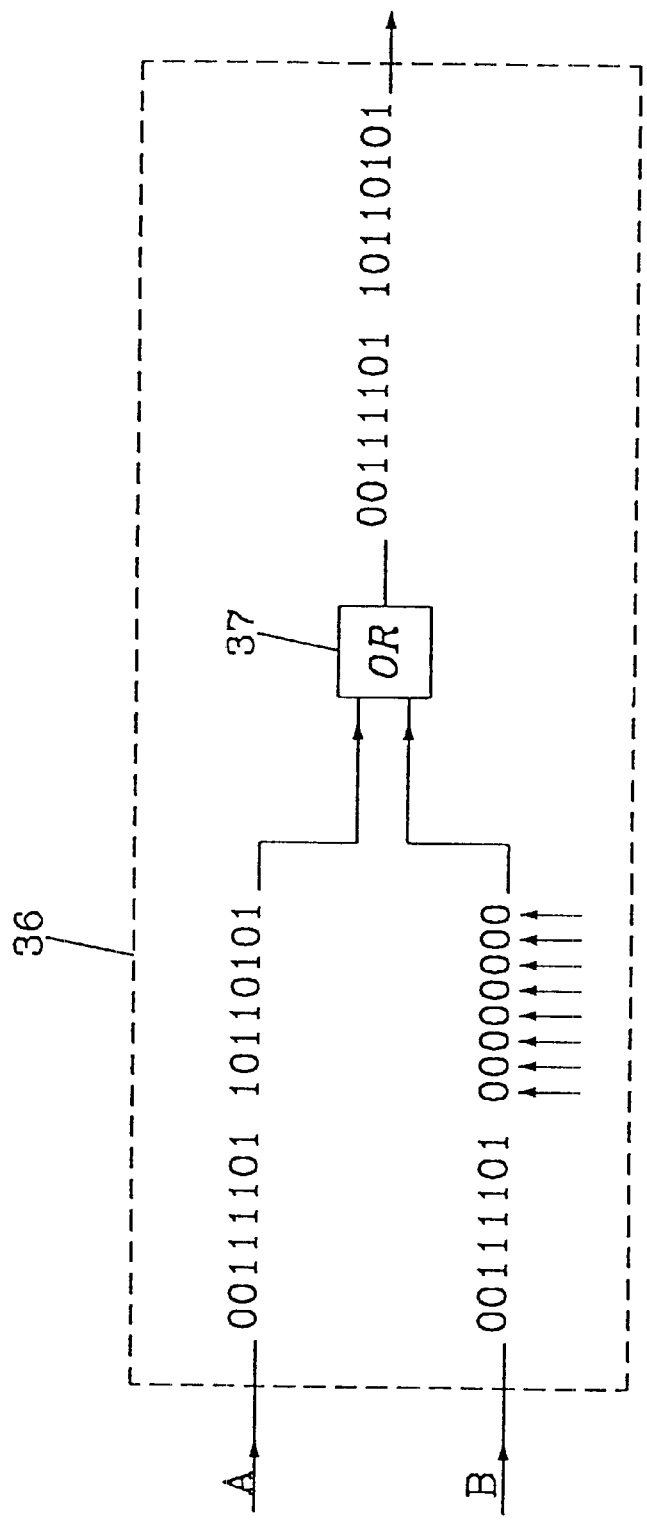
FIG. 3 is a schematic diagram of the termination unit of FIG. 2.

FIG. 3 is a schematic diagram of the termination unit of FIG. 2 with an example of two bytes of information illustrated in each one of the input signals and the output signal of the termination unit. As mentioned earlier with reference to FIG. 2, the termination unit 36 comprises OR-circuitry 37 for logically OR'ing the output signals of the planes on a bit-by-bit basis. In the case of a fault in plane B affecting a complete byte of the processed signal, the D&S-unit 32 will substitute a logical zero for each one the bits of the affected byte, as indicated by the arrows in FIG. 3. The corresponding bits in the processed signal of plane A are valid and unaffected by faults. The received output signals from the planes are OR'ed in the OR-circuitry 37, and the valid bits of plane A will override the corresponding zeroed bits of plane B, thus presenting the valid bits in the non-redundant output signal of the OR-circuitry 37. Logically OR'ing valid bits of plane A with corresponding valid bits of plane B will result in the valid bits being presented in the output signal of the OR-circuitry 37.

Figure 4:
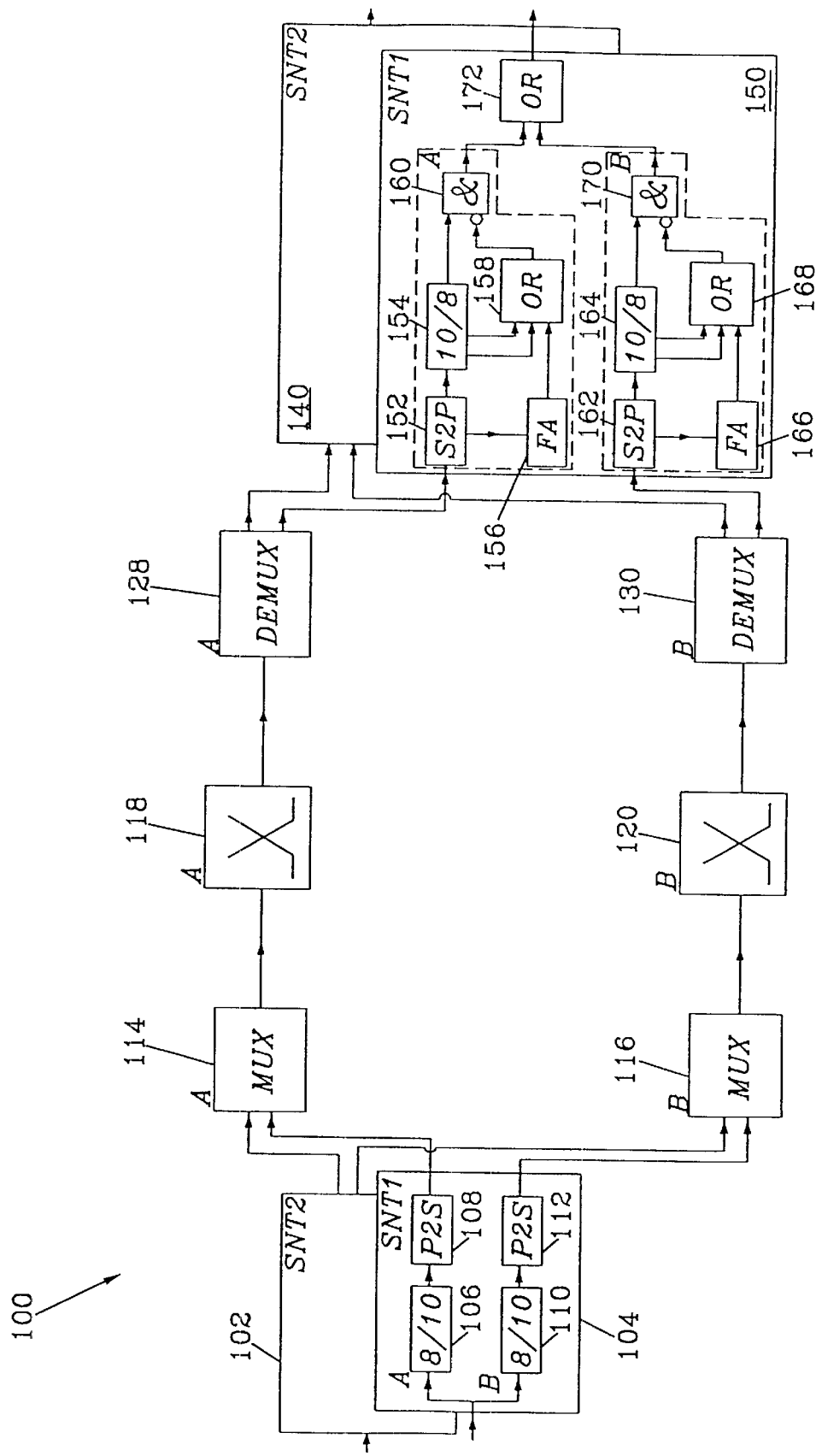
FIG. 4 is a schematic diagram of an illustrative example of a switching system according to a second embodiment of the invention.

FIG. 4 is a schematic diagram of an illustrative example of a switching system according to a second embodiment of the invention. The overall switching system 100 basically comprises switching network terminals (SNTs) 102, 104, 140, 150, multiplexing devices (MUX) 114, 116, switches 118, 120 or equivalents, demultiplexing devices (DEMUX) 128, 130 and physical links that interconnect the network terminals (SNTs), the multiplexing and demultiplexing devices and the switches. Of course, the switching system 100 also comprises a control system (not shown) and various auxiliary devices such as clock modules (not shown). The physical links utilizes transmission equipment such as fiber optic conductors, coaxial cables, back planes or radio links. Conventional aspects of switching systems, such as the actual structure of the switches, control system and clock modules, are well known in the art, and therefore not repeated here. In brief, the control system, normally in the form of a hierarchical processor system, controls the operations, such as establishment of connections, of the overall switching system, and the clock modules provide clock and synchronization signals for synchronizing the operation of the circuits of the switching system.

Although only two incoming SNTs and two outgoing SNTs are shown in FIG. 4, it should be clear that a plurality of SNTs could be used in the system. It is also possible to use different types of SNTs. Furthermore, although only one MUX and one DEMUX are illustrated in each plane, several MUXs and DEMUXs can be used. However, for simplicity, reference will be made to the simplified system of FIG. 4 in the following.

Preferably, the switches 118, 120 are normal word-oriented circuit switches or word-oriented switches connected to bit-oriented subrate switches.

In FIG. 4, traffic is depicted flowing in one direction (from the left to the right) for reasons of simplicity and clarity. In practice however, it should be appreciated that traffic typically flows in both directions.

The switching system 100 has a redundant architecture and comprises two switching planes, plane A and plane B. Although the main part of the switching planes is situated outside the SNTs, part of the switching planes may be incorporated inside the SNTs, and the redundancy is normally initiated as well as terminated at the SNTs. Traffic, such as speech and video traffic, is interfaced to the switching system through the switching network terminals (SNTs). Preferably, the input signals to the switching planes are identical, and the switching planes are normally identical with respect to the processing of the input signals.

In this particular example, transmission coding as described in U.S. Pat. No. 4,486,739 of Franaszek et al. is utilized. In general, transmission codes, also referred to as line codes, are employed to transform the frequency spectrum of a serial data stream so that clocking can be readily recovered. Line codes also provide unique special purpose characters such as frame alignment words and idle patterns. The line coders of U.S. Pat. No. 4,486,739 produce a DC balanced 8B/10B line code for transmission over electromagnetic or optical transmission lines. In FIG. 4, 8B/10B-coders are designated 8/10 and corresponding 10B/8B-decoders are designated 10/8. Although the 8B/10B-coders and the 10B/8B-decoders are illustrated in the SNTs only, it should be understood that each one of the MUXs, the switches and the DEMUXs includes a line decoder and a line coder such that the line code is used for transmission between the circuits of the switching system only, and not inside the circuits.

Each incoming SNT 102, 104 receives an input signal which is distributed to each one of the switching planes. The first incoming SNT 104, SNT1, receives an input signal which is distributed to a first series connection of a line coder 106 and a parallel-to-serial converter 108 (plane A), and a second series connection of a line coder 110 and a parallel-to-serial converter 112 (plane B). The line coded serial stream of data from the parallel-to-serial converter 108 is transmitted to the MUX 114, and the line coded serial stream of data from the parallel-to-serial converter 112 is transmitted to the MUX 116. The second incoming SNT 102, SNT2, is similar or identical to the first SNT 104, and receives another input signal which is distributed to each one of the switching planes such that each MUX 114/116 receives a further line coded serial stream of data from the second SNT 102. As mentioned above, each one of the MUXs 114, 116 includes 10B/8B-decoding circuitry (not shown) for converting each 10 bit word into 8 bits for internal processing in the multiplexing device. In each one of the MUXs 114, 116, the data signals from the first and second SNTs 102, 104 are multiplexed and combined into a single parallel output signal. The combined parallel output signal is transformed into line code by a 8B/10B-coder (not shown) and converted into a serial stream of data by a serial-to-parallel converter (not shown). The serial stream of data from the MUX 114 is transmitted to the switch 118, and the serial stream of data from the MUX 116 is transmitted to the switch 120. In the switches 118, 120, the line code is decoded, conventional circuit switching of time slots is performed, and switched data is coded into line code again. The output signals of the switches 118 and 120 are sent to the demultiplexing devices 128 and 130, respectively. In each one of the demultiplexing devices, DEMUXs, 128, 130, the serial stream of switched data from the corresponding switch is decoded, converted into parallel data and demultiplexed into two parallel data signals. Each one of the parallel data signals is line coded in the DEMUX, converted into serial form and transmitted to a respective one of the outgoing SNTs 140, 150.

Consequently, each one of the outgoing SNTs 140, 150 receives a serial stream of line coded data from each one of the switching planes A and B. The outgoing SNTs are preferably identical to each other, and therefore only one of the outgoing SNTs will be described in the following. In the outgoing SNT 150, SNT1, the serial stream of data from the DEMUX 128 of plane A is received by a serial-to-parallel converter 152 which converts the serial data into parallel data. The parallel data from the converter 152 is sent to a line decoder 154 which decodes each coded 10 bit word into 8 bits of data. The decoded data from the decoder 154 is sent to an AND-circuit 160. The line decoder 154 is also capable of detecting errors such as line code errors. The decoder 154 is utilized to generate a number of control signals that are indicative of different conditions such as detection of a line code error. The parallel data from the converter 152 is also sent to a detector 156 for lost frame alignment. The lost frame alignment detector 156 generates a control signal that is high at lost frame alignment, and low otherwise. The control signals from the line code decoder 154 and the control signal of the lost frame alignment detector 156 are sent to an OR-circuit 158 which produces a first primary control signal which is high at detection of a fault in plane A. The first primary control signal is sent to the AND-circuit 160 and inverted at an inverting input terminal of the AND-circuit 160. In response to detection of a fault, by the line code decoder 154 and/or the detector 156 for lost frame alignment, the first primary control signal will be high for those signal components that are associated with the detected fault, and the inherent functionality of the AND-circuit 160 will then substitute a signal component representing a logical zero for each one of those components of the decoded signal from the decoder 154 that are affected by the detected fault.

In the outgoing SNT 150, SNT1, the serial stream of data from the DEMUX 130 of plane B is received by a serial-to-parallel converter 162 which converts the serial data into parallel data. The parallel data from the converter 162 is sent to a line decoder 164 which decodes each coded 10 bit word into 8 bits of data. The decoded data from the decoder 164 is sent to an AND-circuit 170. The decoder 164 is also capable of detecting errors such as line code errors and generates control signals that are indicative of different conditions such as detection of a line code error. The parallel data from the converter 162 is also sent to a lost frame alignment detector 166 which generates a control signal that is high at lost frame alignment, and low otherwise. The control signals from the line code decoder 164 and the lost frame alignment detector 166 are sent to an OR-circuit 168 which produces a second primary control signal which is high at detection of a fault in plane B. The second primary control signal is sent to the AND-circuit 170 and inverted at an inverting input terminal of the AND-circuit 170. In response to detection of a fault, the second primary control signal will be high for those signal components that are associated with the detected fault, and the inherent functionality of the AND-circuit 170 will substitute a signal component representing a logical zero for each one of those components of the decoded signal from the decoder 164 that are affected by the detected fault.

The outgoing SNT 150 further comprises an OR-circuit 172 which receives the output signals of the AND-circuits 160, 170 and performs logical OR-operations on the received signals to generate a non-redundant output signal.

It will be appreciated that fault detection circuitry and substituting circuitry can be arranged at any suitable place in the system 100. The line code error detecting capability of the 10B/8B-decoders in the MUXs 114, 116, switches 118, 120 and DEMUXs 128, 130 can be used in combination with the "resetting" functionality of AND-circuits to act as detecting and substituting circuitry. Parity generators and parity checkers in combination with "resetting" circuitry can be provided inside the MUXs 114, 116, inside the switches 118, 120 and inside the DEMUXs 128, 130. By way of example, assume that one of the parity checkers in plane A has detected a parity error associated with a byte of information. This will cause the substituting AND-circuitry connected to the parity checker to substitute a logical zero for each one of those bits of the signal processed in plane A that are affected by the parity error. Each bit of the byte associated with the parity error is reset to "0". The zeroed bits of the affected byte in plane A and the corresponding bits of plane B will then be OR'ed together in an outgoing SNT, thus presenting the bits from plane B (assumed to be valid) as output bits in the non-redundant output signal of the SNT.

Another example of a fault detecting circuit, to be used in a switching plane, comprises duplicated processing hardware and circuitry for comparing the output signals of the duplicated processing hardware. If the compared output signals differ from each other, a fault is considered as detected.

The redundancy termination according to the first and second embodiments of invention is based on the facts that:

1) a detection of a fault in a plane leads to the resetting of the bits that are affected by the detected fault to "0", and
2) the output signals of the switching planes are OR'ed together to increase the likelihood that valid output bits will be generated. The redundancy termination according to the invention though has an inherent problem in that the establishment of connections do not necessarily occur at the same time in the switching planes. If a connection has not yet been established in one of the planes, say plane B, an "idle pattern" will generally be transmitted in plane B. An "idle pattern" is a special purpose character transmitted when no connection is established. If the corresponding connection has been established in plane A such that speech or video data is being transmitted, the idle pattern from plane B and the data from plane A will be OR'ed together in the SNT, leading to a distorsion of the valid data. This problem is solved by detecting the idle pattern, and resetting the bits of the idle pattern to logical zeros, "0". In this way, the valid speech data from plane A will be presented as output bits after the OR-operation.

Figure 5:
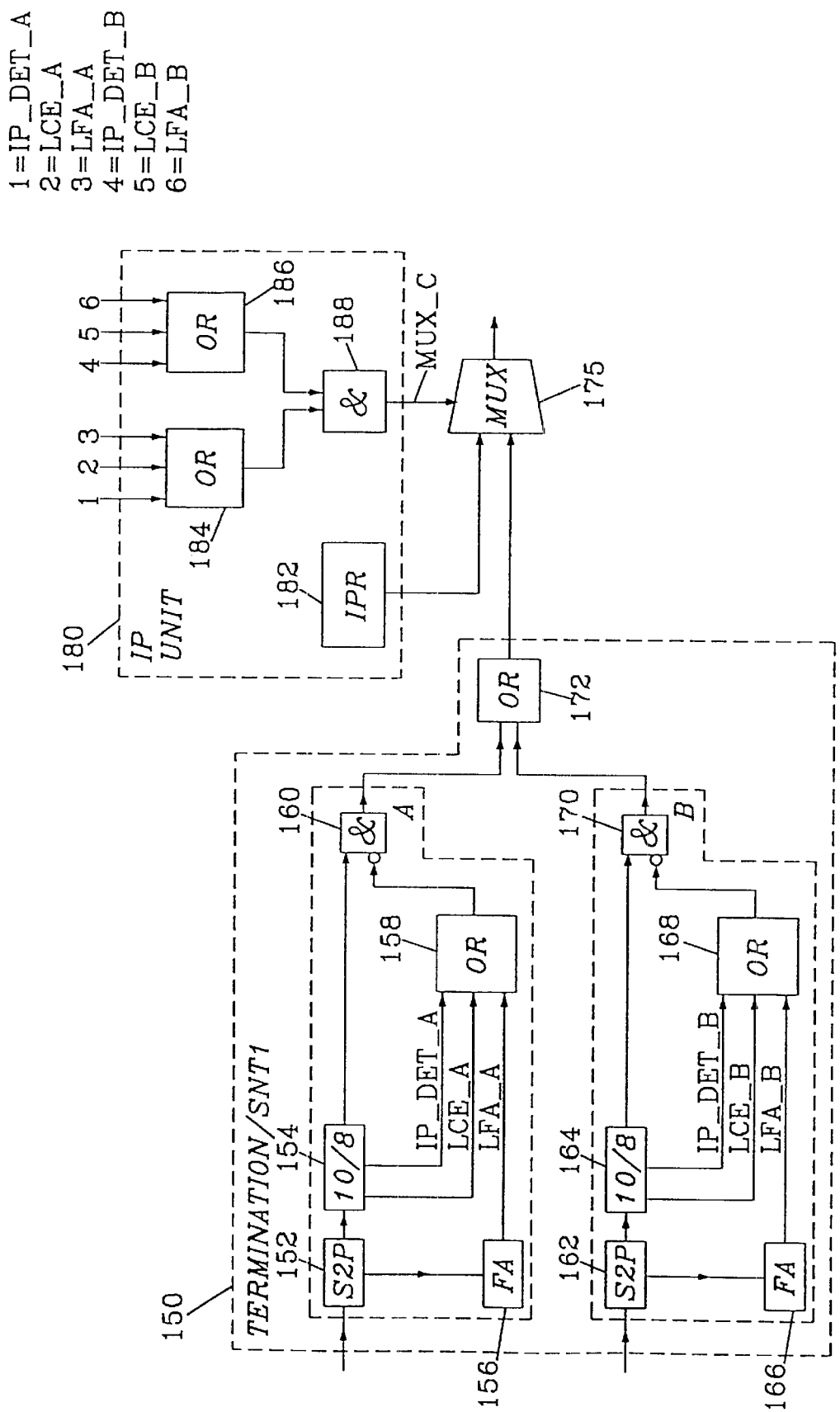
FIG. 5 is a schematic diagram illustrating the SNT 150 of FIG. 4 in greater detail, together with a unit for handling "idle pattern" in special circumstances.

FIG. 5 is a schematic diagram illustrating the SNT 150 of FIG. 4 in greater detail, together with a unit for handling "idle pattern" in special circumstances. The outgoing SNT 150 includes fault detecting circuitry and substituting circuitry for each one of the switching planes A and B. The fault detecting circuitry and the substituting circuitry for plane A includes the line code decoder 154, the lost frame alignment detector 156, the OR-circuit 158 and the AND-circuit 160. The fault detecting circuitry and the substituting circuitry for plane B includes the line code decoder 164, the lost frame alignment detector 166, the OR-circuit 168 and the AND-circuit 170. In addition, the serial-to-parallel converters 152, 162 are utilized to convert the serial data used outside the SNT 150 into parallel data used within the SNT.

The decoders 154, 164 are preferably constructed in accordance with U.S. Pat. No. 4,486,739 referred to earlier. The decoders 154, 164 are capable of detecting line code errors as well as special purpose characters such as "idle patterns", and capable of handling bit errors. The decoder 154 of plane A generates a control signal IP_DET_A which goes high at detection of an idle pattern, and a control signal LCE_A which goes high at detection of a line code error. Correspondingly, the line code decoder 164 of plane B generates a control signal IP_DET_B which goes high at detection of an idle pattern, and a control signal LCE_B which goes high at detection of a line code error. The lost frame alignment detector 156 of plane A generates a control signal LFA_A which is low at frame alignment and high at lost frame alignment. The lost frame alignment detector 166 of plane B generates a control signal LFA_B which is low at frame alignment and high at lost frame alignment.

For plane A, the control signals IP_DET_A and LCE_A from the decoder 154 and the control signal LFA_A from the lost frame alignment detector 156 are sent to the OR-circuit 158 which is operable for logically OR'ing the received control signals to generate a primary control signal for plane A. The primary control signal of the OR-circuit 158 is high when at least one of the received control signals IP_DET_A, LCE_A and LFA_A is high. The primary control signal for plane A is sent to the AND-circuit 160 and inverted by the inverting input terminal thereof The decoded parallel data signal from the decoder 154 is sent to the other input terminal of the AND-circuit, and the data signal from the decoder 154 and the primary control signal from the OR-circuit 158 are AND'ed on a bit-by-bit basis in the AND-circuit to generate an output signal of plane A that, in the event of a fault, facilitates recovery of valid data from the other plane.

The decoded signal of the decoder 154 and the primary control signal of the OR-circuit 158 are synchronized by means of clock signals from a clock module (not shown) such that the signal components of the decoded signal are AND'ed with corresponding components of the primary control signal.

For plane B, the control signals IP_DET_B and LCE_B and the control signal LFA_B are sent to the OR-circuit 168 which is operable for logically OR'ing the received control signals to generate a primary control signal for plane B. The primary control signal of the OR-circuit 168 is high when at least one of the received control signals is high. The primary control signal for plane B is sent to the AND-circuit 170 and inverted by the inverting input terminal thereof. The decoded parallel data signal from the decoder 164 is sent to the other input terminal of the AND-circuit 170, and the data signal from the decoder 164 and the primary control signal from the OR-circuit 168 are AND'ed on a bit-by-bit basis in the AND-circuit 170 to generate an output signal of plane B.

The output signals of the AND-circuits 160, 170, or in other words, the output signals of planes A and B, are OR'ed on a bit-by-bit basis in the OR-circuit 172 of the outgoing SNT 150 to generate a non-redundant output signal.

The line coders and line decoders suggested above are just examples of line coding and decoding circuitry. Any conventional line coders and decoders may be used.

It should also be understood that it is not necessary to use line code in the switching system. Serial interfaces with parity can be used, as indicated in the system of FIG. 2. Another alternative would be to utilize parallel interfaces with parity.

In FIG. 5, there is also illustrated a unit for handling "idle pattern" in special circumstances and a multiplexor. The idle pattern unit 180 basically comprises a register 182 for storing an idle pattern, a first OR-circuit 184, a second OR-circuit 186 and an AND-circuit 188. The multiplexor 175 receives the non-redundant output signal of the OR-circuit 172 and the idle pattern from the idle pattern register 182. The AND-circuit 188 of the idle pattern unit 180 generates a control signal MUX_C controlling the operation of the MUX 175.

If there are faults in both planes affecting corresponding signal components, i.e. a double fault situation, the affected signal components of both planes will be zeroed by the AND-circuits 160, 170, and the zeroed signal components will be OR'ed in the OR-circuit 172 to generate logical zeros in the output signal of the OR-circuit 172. However, logical zeros in the output signal of the OR-circuit may create an irritating clicking sound in the loudspeaker of a telephone connected to the switching system. Therefore, it is normally better to transmit an idle pattern in the non-redundant output signal at a double fault. Idle patterns are specified by international standards.

In addition, if idle patterns are transmitted in both planes, the idle pattern of each plane will be substituted by logical zeros by the AND-circuits 160, 170, and the zeroed signal components will be OR'ed in the OR-circuit 172 to generate logical zeros in the output signal of the OR-circuit 172. However, if both planes transmits idle patterns, it is more appropriate to have an idle pattern in the non-redundant output signal rather than logical zeros.

Therefore, the control signals from the decoders 154, 164 and the lost frame alignment detectors 156, 166 are sent to the idle pattern unit 180. The first OR-circuit 184 receives the control signals IP_DET_A (1), LCE_A (2) and LFA_A (3) from plane A, and the second OR-circuit 186 receives the control signals IP_DET_B (4), LCE_B (5) and LFA_B (6) from plane B. The output signal from the first OR-circuit 184 is high when at least one of the control signals 1, 2, 3 received from plane A is high, and the output signal from the second OR-circuit 186 is high when at least one of the control signals 4, 5, 6 received from plane B is high. The output signals of the first and second OR-circuits 184, 186 are sent to the AND-circuit 188 which generates the control signal MUX_C. The control signal MUX_C is high when the output signals of the first and second OR-circuits 184, 186 are both high. The output terminal of the AND-circuit is connected to the control input terminal of the MUX 175, and control signal MUX_C controls the MUX 175. If MUX_C is high, the MUX 175 will forward an idle pattern from the idle pattern register 182 in the output signal of the MUX 175. If MUX_C is low, the MUX 175 will forward the output signal of the OR-circuit 172.

This means that if an idle pattern is detected in each one of the planes, IP_DET_A and IP_DET_B goes high, and the output signals of the first and second OR-circuits 184, 186 goes high, leading to a high control signal MUX_C from the AND-circuit 188. The MUX 175 will transmit an idle pattern from the idle pattern register 182 as long as MUX_C is high.

In the same way, if there is a double fault situation affecting corresponding signal components in the planes, e.g. lost frame alignment in plane A as well as in plane B, LFA_A and LFA_B goes high, and the output signals of the first and second OR-circuits 184, 186 goes high, leading to a high control signal MUX_C from the AND-circuit 188. The MUX 175 will transmit an idle pattern from the idle pattern register 182 as long as MUX_C is high.

However, the terminating SNT 150 itself does not recognize a double fault that has been detected by detecting units provided in the MUXs, the switches or the DEMUXs of the switching system, it only sees bytes with all logical zeros since the bytes affected by the double fault have been substituted by logical zeros. The SNT 150 will normally treat the received logical zeros as normal traffic and the OR-gate 172 will forward logical zeros. These zeros may create an irritating clicking sound in the loudspeaker of the telephone connected to the switching system. To solve this problem, an alternative detecting and substituting unit is utilized.

Figure 6:
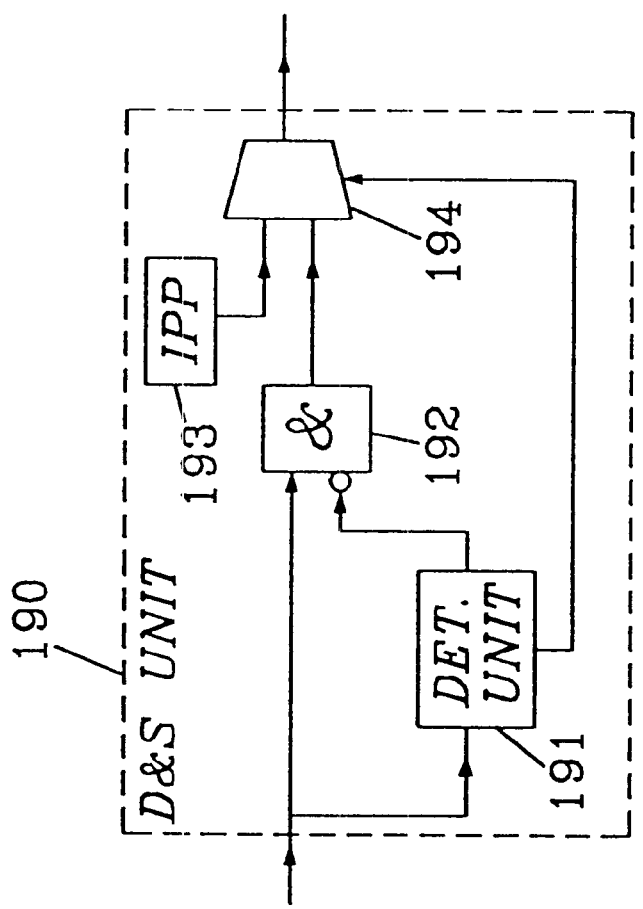
FIG. 6 is a schematic diagram of an alternative detecting and substituting unit according to the invention.

FIG. 6 is a schematic diagram of such an alternative detecting and substituting unit according to the invention. The detecting and substituting unit 190 comprises a detecting unit 191 and an AND-circuit 192 corresponding to the D&S-units 28 and 32 of FIG. 2. However, the D&S-unit 190 further comprises an idle pattern register 193 and a multiplexor 194. The multiplexor 194 is connected to receive the idle pattern of the register 193 and the output signal of the AND-circuit 192, and is controlled by a control signal from the detecting unit 191. When the detecting unit 191 detects a fault affecting a whole byte it further has the possibility to set a control signal for the multiplexor 194 such that the multiplexor 194 selects the idle pattern from the register 193 instead of the output signal from the AND-circuit 192. In this way, an affected byte may be substituted by an idle pattern, or a signal representative of an idle pattern. So instead of logical zeros, an idle pattern is transmitted to the terminating SNT 150 at detection of a fault that affects a whole byte. If there is a double fault situation affecting corresponding bytes in the planes and detecting and substituting units 190 are provided in the planes, idle patterns will be transmitted to the SNT 150 and detected by the decoders 154 and 164 (FIG. 5). This means that IP_DET_A and IP_DET_B goes high, leading to a high control signal MUX_C from the AND-circuit 188. The MUX 175 will transmit an idle pattern from the idle pattern register 182 as long as MUX_C is high.

However, if the detecting unit 191 detects a fault that only affects single bits, the control signal from the detecting unit 191 will normally be set in such a way that the output signal of the AND-circuit 192 is transmitted through the multiplexor 194. In this case, the affected bits are zeroed in the AND-circuit as described above with reference to FIG. 2, and the zeroed bits are transmitted to the terminating SNT 150. This is particularly useful in bit-oriented switching, also referred to as subrate switching.

In alternative embodiments of the present invention, the "resetting" of affected signal components to logical zero and logically OR'ing the output signals of the planes are replaced by "setting" the affected signal components to logical one combined with logically AND'ing the output signals of the planes.

Figure 7:
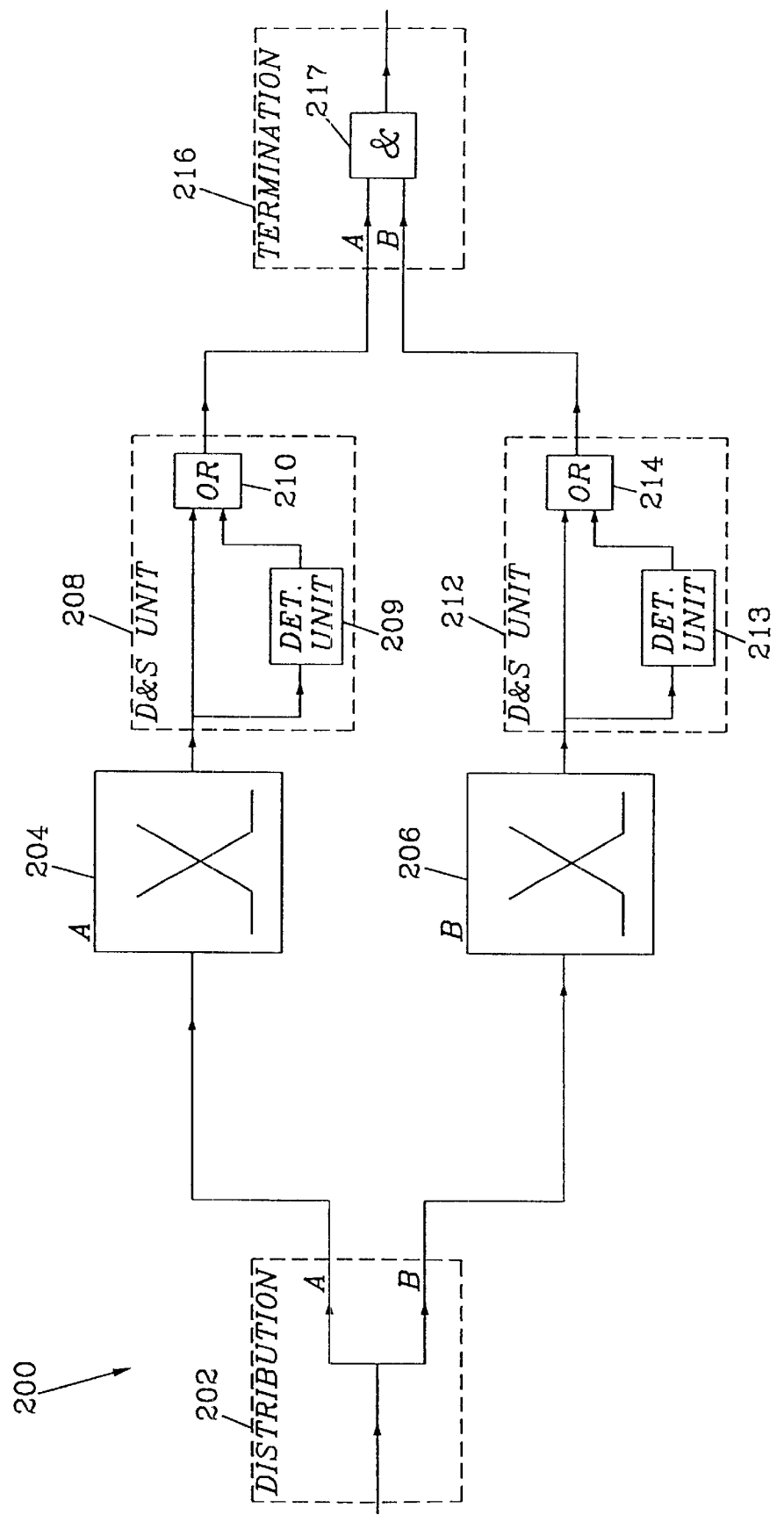
FIG. 7 is a schematic diagram of an illustrative example of a switching system similar to that of FIG. 2.

FIG. 7 is a schematic diagram of an illustrative example of a switching system similar to that of FIG. 2. In FIG. 7 however, the termination unit 216 includes an AND-circuit 217 for logically AND'ing the output signals of the planes to generate the non-redundant output signal. Preferably, the AND-circuit 217 is in the form of a plurality of AND-gates such that the operation of logically AND'ing is performed on a bit-by-bit basis. Each one of the detecting and substituting units 208 and 212 is capable of detecting faults in the plane that affect one or more signal components of the processed input signal. In response to detection of a fault, each D&S-unit 208/212 substitutes a signal component representing a logical one, "1", for each one of those signal components that are affected by the detected fault. In the example of FIG. 7, each D&S-unit 208/212 comprises a detecting unit 209/213 and an OR-circuit 210/214. The detecting unit 209 generates a control signal which is high at detection of a fault and low otherwise. The OR-circuit 210 receives the output signal of the switch 204 and the control signal from the detecting unit 209. Preferably, the OR-circuit 210 is in the form of a plurality of OR-gates such that the output signal of the switch 204 is logically OR'ed with the control signal on a bit-by-bit basis. The detecting unit 213 and the OR-circuit 214 are connected in the same way as in the D&S-unit 208.

Figure 8:
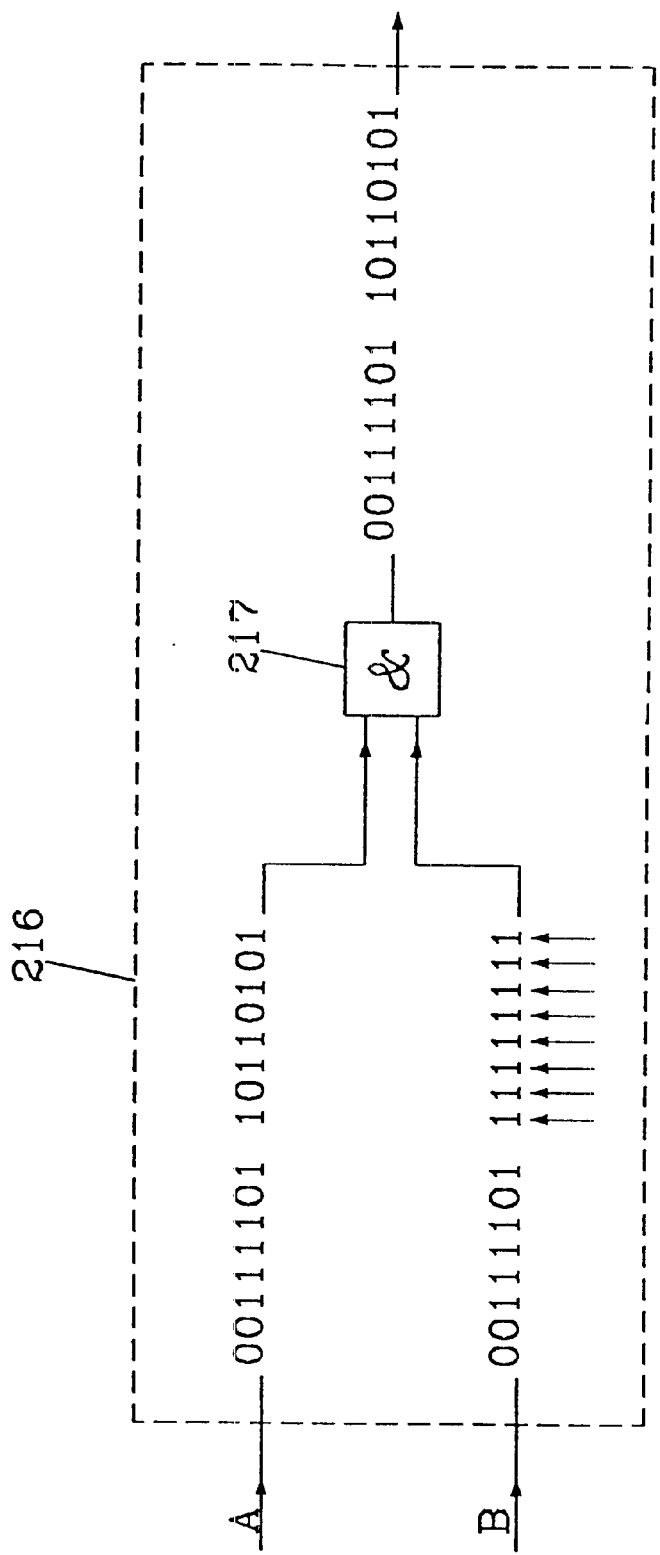
FIG. 8 is a schematic diagram of the termination unit of FIG. 7.

FIG. 8 is a schematic diagram of the termination unit of FIG. 7 with an example of two bytes of information illustrated in each one of the input signals and the output signal of the termination unit. As mentioned earlier with reference to FIG. 7, the termination unit 216 comprises an AND-circuit 217 for logically AND'ing the output signals of the planes on a bit-by-bit basis. In the case of a fault in plane B affecting a complete byte of the processed signal, the D&S-unit 212 will substitute a logical one, "1", for each one the bits of the affected byte, as indicated by the arrows in FIG. 8. The corresponding bits in the processed signal of plane A are valid and unaffected by faults. The received output signals from the planes are AND'ed in the AND-circuit 217, and the valid bits of plane A will override the corresponding bits of plane B that are set to "1", thus presenting the valid bits in the non-redundant output signal of the AND-circuit 217. Logically AND'ing valid bits of plane A with corresponding valid bits of plane B will result in the valid bits being presented in the output signal of the AND-circuit 217.

Figure 9:
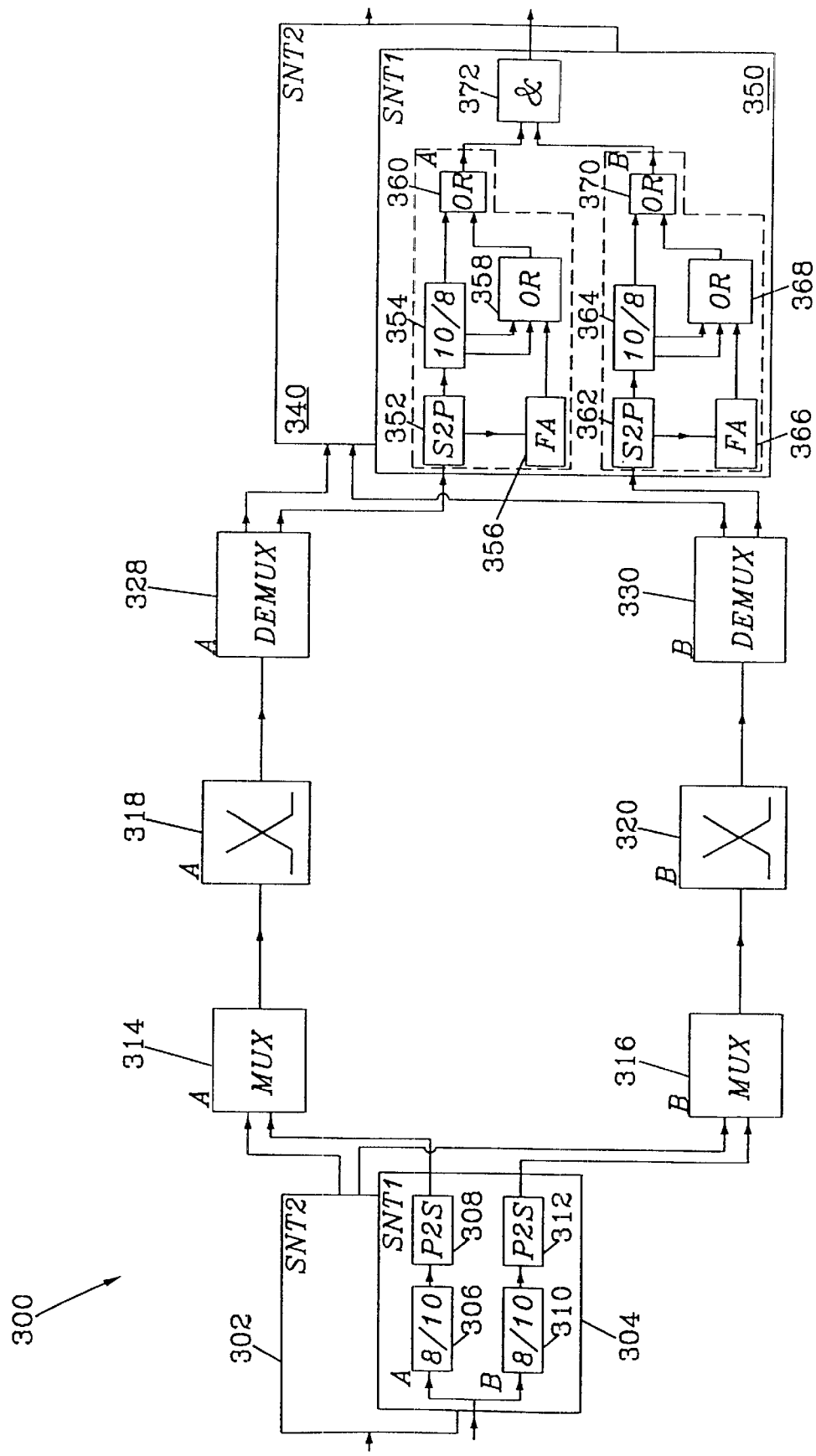
FIG. 9 is a schematic diagram of an illustrative example of a switching system similar to that shown in FIG. 4.

FIG. 9 is a schematic diagram of an illustrative example of a switching system similar to that shown in FIG. 4. The overall switching system 300 basically comprises switching network terminals (SNTs) 302, 304, 340, 350, multiplexing devices (MUX) 314, 316, switches 318, 320 or equivalents, demultiplexing devices (DEMUX) 328, 330 and physical links that interconnect the network terminals (SNTs), the multiplexing and demultiplexing devices and the switches.

In the system of FIG. 9 however, the outgoing SNTs 340 and 350 differ from those of FIG. 4 in that the AND-circuits 160 and 170 of FIG. 4 now are replaced by OR-circuits 360 and 370. In addition, the terminating OR-circuit 172 of FIG. 4 is now replaced by a terminating AND-circuit 372. Besides, parity generators and parity checkers provided inside the switches and the multiplexing and demultiplexing devices are now combined with "setting" OR-circuits instead of "resetting" AND-circuits. In all other regards, the switching system 300 of FIG. 9 operates in the same way as the switching system 100 of FIG. 4.

It is also possible to connect the idle pattern unit and the multiplexor of FIG. 5 to the switching system 300 of FIG. 9. In that case, the output signal of the AND-circuit 372 and the idle pattern signal from the idle pattern register 182 are sent to the MUX 175 controlled by the control signal of the idle pattern unit 180.

It should be understood that the invention is generally applicable to any processing system that includes redundant processing planes; the processing planes need not be switching planes as described above with reference to the exemplary embodiments.

In a more general form of the invention, each one of the signal components that are affected by a detected fault is substituted by a signal component, referred to as a control component, of a predetermined logical state. The logically OR'ing and logically AND'ing are merely examples of the more general function of performing logical operations on the output signals of the planes such that, in the generation of the non-redundant output signal, unaffected signal components in a processed signal will override corresponding control components in another processed signal. There are many examples of logical operations that are equivalents to AND and OR. These equivalents are normally in the form of combinations of a number of logical operations, such as inverting operations and operations like NAND and NOR.

Figure 10:
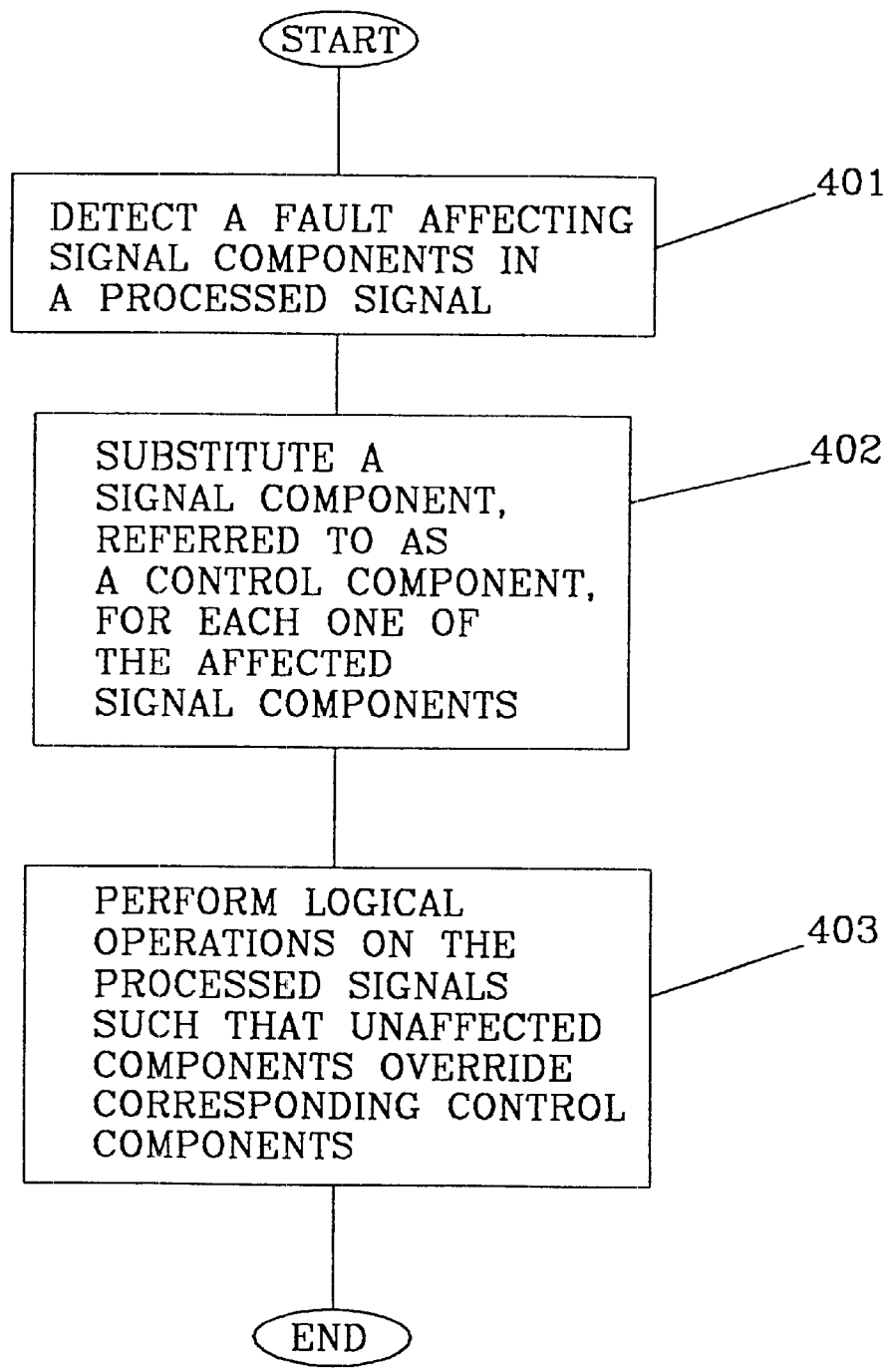
FIG. 10 is a schematic flow diagram of a method for terminating at least two processed signals into a non-redundant signal.

FIG. 10 is a schematic flow diagram of a method for terminating at least two processed signals into a non-redundant signal. Each one of the processed signals comprises a number of signal components. In step 401, a fault affecting at least one of the signal components of a first processed signal is detected. In response to detection of a fault, in step 402; each one of the affected signal components of the first processed signal is substituted by a signal component, referred to as a control component, representing a predetermined logical state. Next, in step 403 logical operations are performed on the processed signals such that unaffected signal components in a second processed signal override corresponding control components in the first processed signal, thus terminating the processed signals in such a way that valid signal components are presented in the non-redundant output signal.

According to one embodiment, each control component represents the logical state "0", and the processed signals are logically OR'ed to generate the non-redundant output signal.

According to another embodiment, each control component represents the logical state "1", and the processed signals are logically AND'ed to generate the non-redundant output signal.

According to a preferred embodiment of the invention, the method described above with reference to FIG. 10 is used to operate a processing system that has at least two processing planes. Each processing plane is operable for processing an input signal to generate an output signal, and the output signals of the processing planes are terminated into a non-redundant output signal in plane termination logic.

Furthermore, the method further comprises the steps of detecting an "idle pattern" in the processed input signal of a processing plane, and substituting, in response to detection of an idle pattern, a control component for each signal component of the "idle pattern" in the processed input signal.

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed herein are within the scope and spirit of the invention.

What is claimed is:

1. A fault tolerant processing system comprising:
   at least two processing planes, each one of the processing planes being operable for processing an input signal comprising a number of signal components; and
   plane termination logic for receiving an output signal from each one of the processing planes to generate a non-redundant output signal, wherein:
   each processing plane comprises:
       means for detecting a fault in the plane; and
       means for substituting, in response to detection of a fault in the plane, a signal component representing a logical zero for each one of those components of the processed input signal that are affected by the detected fault; and
   the plane termination logic comprises means (37; 172) for logically OR'ing the received output signals to generate the non-redundant output signal.

2. A fault tolerant processing system according to claim 1, wherein the said means for logically OR'ing performs the OR'ing of the received output signals on a bit-by-bit basis.

3. A fault tolerant processing system according to claim 1, wherein the input signals to the processing planes are identical and the processing planes are identical with respect to the processing of the input signals.

4. A fault tolerant processing system according to claim 1, wherein the said fault detecting means comprises at least one of the following: a parity checker, an incorrect checksum detector, a line code error detector and a lost frame alignment detector.

5. A fault tolerant processing system according to claim 1, wherein the fault detecting means comprises:
   duplicated processing hardware in the processing plane; and
   circuitry for comparing the output signals of the duplicated processing hardware, wherein a fault is considered as detected when the compared output signals differ from each other.

6. A fault tolerant processing system according to claim 1, wherein each processing plane further comprises:
   means for detecting an "idle pattern" in the processed input signal; and
   means for substituting, in response to detection of an "idle pattern", a signal component representing a logical zero for each signal component of the "idle pattern".

7. A fault tolerant processing system according to claim 6, wherein the system further comprises means for substituting, in response to detection of an "idle pattern" in each one of the processing planes, signal components representing the "idle pattern" for the corresponding signal components of the non-redundant output signal.

8. A fault tolerant processing system according to claim 1, wherein the system further comprises means for substituting, in response to detection of a respective fault in each one of the processing planes and where the detected faults affect corresponding signal components in all the planes, signal components representing an "idle pattern" for those signal components of the non-redundant output signal that are associated with the detected faults.

9. A fault tolerant processing system according to claim 1, wherein each one of the processing planes comprises at least one of the following: a switching unit a multiplexor and a demultiplexor.

10. A fault tolerant processing system comprising:
at least two processing planes, each one of the processing planes being operable for processing an input signal comprising a number of signal components; and
plane termination logic for receiving an output signal from each one of the processing planes to generate a non-redundant output signal, wherein:
each processing plane comprises:
means for detecting a fault in the plane; and
means for substituting, in response to detection of a fault in the plane, a signal component representing a logical one for each one of those components of the processed input signal that are affected by the detected fault; and
the plane termination logic comprises means for logically AND'ing the received output signals to generate the non-redundant output signal.

11. A fault tolerant processing system according to claim 10, wherein said means (217;372) for logically AND'ing performs the AND'ing of the received output signals on a bit-by-bit basis.

12. A fault tolerant processing system according to claim 10, wherein the input signals to the processing planes are identical and the processing planes are identical with respect to the processing of the input signals.

13. A fault tolerant processing system according to claim 10, wherein the said detecting means comprises at least one of the following: a parity checker, an incorrect checksum detector, a line code error detector and a lost frame alignment detector.

14. A fault tolerant processing system according to claim 10, wherein the fault detecting means comprises:
duplicated processing hardware in the processing plane; and
circuitry for comparing the output signals of the duplicated processing hardware, wherein a fault is considered as detected when the compared output signals differ from each other.

15. A fault tolerant processing system according to claim 10, wherein each processing plane further comprises:
means for detecting an "idle pattern" in the processed input signal; and
means for substituting, in response to detection of an "idle pattern", a signal component representing a logical one for each signal component of the "idle pattern".

16. A fault tolerant processing system according to claim 15, wherein the system further comprises means for substituting, in response to detection of an "idle pattern" in each one of the processing planes, signal components representing the "idle pattern" for the corresponding signal components of the non-redundant output signal.

17. A fault tolerant processing system according to claim 10, wherein the system further comprises means for substituting, in response to detection of a respective fault in each one of the processing planes and where the detected faults affect corresponding signal components in all the planes, signal components representing an "idle pattern" for those signal components of the non-redundant output signal that are associated with the detected faults.

18. A fault tolerant processing system according to claim 10, wherein each one of the processing planes comprises at least one of the following: a switching unit, a multiplexor and a demultiplexor (328/330).

19. A fault tolerant processing system comprising:
at least two processing planes, each one of said processing planes being operable for processing an input signal to generate an output signal, the input signal and the output signal each comprising a number of signal components; and
plane termination logic for receiving the output signals from said processing planes to generate a non-redundant output signal,
wherein each processing plane comprises:
means for detecting a fault in the plane; and
means for substituting, in response to detection of a fault in the plane, a signal component, hereinafter referred to as control component, representing a predetermined logical state for each one of those components of the processed input signal that are affected by the detected fault; and
the plane termination logic comprises means for performing logical operations on the received output signals such that, in the generation of the non-redundant output signal, unaffected signal components in a received output signal override corresponding control components in another received output signal.

20. A fault tolerant processing system according to claim 19, wherein the said means for performing logical operations performs the logical operations on the received output signals on a bit-by-bit basis.

21. A fault tolerant processing system according to claim 19, wherein the input signals to the planes are identical and the processing planes are identical with respect to the processing of the input signals.

22. A fault tolerant processing system according to claim 19, wherein the fault is a hardware detectable fault.

23. A fault tolerant processing system according to claim 19, wherein each one of the processing planes comprises at least one of the following: a switching unit, a multiplexor and a demultiplexor.

24. A fault tolerant processing system according to claim 19, wherein each processing plane further comprises:
means for detecting an "idle pattern" in the processed input signal; and
means for substituting, in response to detection of an "idle pattern", a control component for each signal component of the "idle pattern".

25. A fault tolerant processing system according to claim 24, wherein the system further comprises means for substituting, in response to detection of an "idle pattern" in each one of the processing planes, signal components representing the "idle pattern" for the corresponding signal components of the non-redundant output signal.

26. A fault tolerant processing system according to claim 19, wherein the system further comprises means for substituting, in response to detection of a respective fault in each one of the processing planes and where the detected faults affect corresponding signal components in all the planes, signal components representing an "idle pattern" for those signal components of the non-redundant output signal that are associated with the detected faults.

27. A fault tolerant processing system according to claim 19, wherein each processing plane further comprises means for substituting, in response to detection of a fault in the plane affecting a word of the processed input signal, a signal representing an "idle pattern" for the affected word.

28. A processing plane for use with at least one like processing plane in a fault tolerant system, the processing plane being operable for processing an input signal comprising a number of signal components, wherein the processing plane comprises:

means for detecting a fault in the plane; and
    means for substituting, in response to detection of a fault in the plane, a signal component representing a predetermined logical state for each one of those components of the processed input signal that are affected by the detected fault.

29. A processing plane according to claim 28, wherein the processing plane includes at least one of the following: a switching unit, a multiplexor, and a demultiplexor.

30. A processing plane according to claim 28, wherein the fault is a hardware detectable fault.

31. A method of operating a fault tolerant processing system having at least two processing planes, each one of the processing planes being operable for processing an input signal to generate an output signal, the input signal comprising a number of signal components, wherein the output signals of the processing planes are terminated into a non-redundant output signal, the method comprising the steps of:

detecting a fault in a processing plane, the fault affecting at least one of the signal components of the processed input signal of the processing plane; and
    substituting, in response to detection of a fault, a signal component representing a logical zero for each one of those signal components of the processed input signal that are affected by the detected fault; and
    logically OR'ing the output signals of the processing planes to generate the non-redundant output signal.

32. A method of operating a fault tolerant processing system having at least two processing planes, each one of the processing planes being operable for processing an input signal to generate an output signal, the input signal comprising a number of signal components, wherein the output signals of the processing planes are terminated into a non-redundant output signal, the method comprising the steps of:

detecting a fault in a processing plane, the fault affecting at least one of the signal components of the processed input signal of the processing plane; and
    substituting, in response to detection of a fault, a signal component representing a logical one for each one of those signal components of the processed input signal that are affected by the detected fault; and
    logically AND'ing the output signals of the processing planes to generate the non-redundant output signal.

33. A method of operating a fault tolerant processing system having at least two processing planes, each one of the processing planes being operable for processing an input signal to generate an output signal, the input signal and the output signal comprising a number of signal components, wherein the output signals of the processing planes are terminated into a non-redundant output signal, the method comprising the steps of:

detecting a fault in a processing plane, the fault affecting at least one of the signal components of the processed input signal of the processing plane; and
    substituting, in response to detection of a fault, a signal component, hereinafter referred to as a control component, representing a predetermined logical value for each affected signal component of the processed input signal; and
    performing logical operations on the output signals of the processing planes to generate the non-redundant output signal in such a way that unaffected signal components in an output signal override the corresponding control components in another output signal.

34. A method of operating a fault tolerant system according to claim 33, it further comprising the steps of:

detecting an "idle pattern" in the processed input signal of a processing plane; and
    substituting, in response to detection of an "idle pattern", a control component for each signal component of the "idle pattern" in the processed input signal.

35. A method for terminating at least two processed signals into a non-redundant signal, each one of the processed signals including a number of signal components, it comprising the steps of:

detecting a fault affecting at least one of the signal components of a first processed signal;
    substituting, in response to detection of a fault, a signal component, hereinafter referred to as a fault control component, representing a predetermined logical state for each affected signal component of the first processed signal; and
    performing logical operations on the processed signals to terminate the processed signals such that unaffected signal components in a second processed signal override corresponding fault control components in the first processed signal.

* * * * *